(12) United States Patent
Faulkner et al.

(10) Patent No.: US 9,754,738 B2
(45) Date of Patent: Sep. 5, 2017

(54) NETWORK TRANSFORMER PRIMARY DISCONNECT ASSEMBLY

(71) Applicant: COOPER TECHNOLOGIES COMPANY, Houston, TX (US)

(72) Inventors: Mark Faulkner, Greenwood, SC (US); Michael Davis Pearce, Plum Branch, SC (US); Travis Spoone, Greenwood, SC (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 142 days.

(21) Appl. No.: 14/532,243

(22) Filed: Nov. 4, 2014

(65) Prior Publication Data

US 2016/0126029 A1 May 5, 2016

(51) Int. Cl.
| | |
|---|---|
| H02B 1/06 | (2006.01) |
| H01H 9/02 | (2006.01) |
| H02B 11/00 | (2006.01) |
| H01H 9/26 | (2006.01) |
| H01H 33/52 | (2006.01) |
| H01F 27/02 | (2006.01) |
| H01H 31/00 | (2006.01) |

(52) U.S. Cl.
CPC .............. *H01H 9/02* (2013.01); *H01F 27/02* (2013.01); *H01H 9/26* (2013.01); *H01H 33/52* (2013.01); *H02B 1/06* (2013.01); *H02B 11/00* (2013.01); *H01H 31/003* (2013.01); *H01H 2009/0292* (2013.01)

(58) Field of Classification Search
None
See application file for complete search history.

(56) References Cited

U.S. PATENT DOCUMENTS

| | | | | |
|---|---|---|---|---|
| 4,168,414 A * | 9/1979 | Kumbera | ............. | H01H 33/666 200/318 |
| 7,450,364 B2 * | 11/2008 | Parker | ................... | H02B 11/24 361/220 |
| 7,675,738 B2 * | 3/2010 | Fukunaga | .......... | H02B 13/0352 218/10 |
| 8,068,320 B2 | 11/2011 | Faulkner et al. | | |
| 8,658,931 B2 * | 2/2014 | Heller | .............. | H01H 33/66261 218/10 |
| 8,760,853 B1 * | 6/2014 | Bullock | ................. | H02B 11/04 200/50.21 |
| 8,804,372 B2 * | 8/2014 | Faulkner | .............. | H01H 27/002 200/50.05 |
| 9,336,963 B1 * | 5/2016 | Pearce | ..................... | H01H 9/26 |
| 9,356,435 B2 * | 5/2016 | Ricciuti | ................. | H02B 13/02 |
| 2011/0299228 A1 * | 12/2011 | Milovac | ................. | H02B 11/26 361/614 |
| 2015/0296639 A1 * | 10/2015 | Stoner | .................. | H05K 5/0208 361/624 |
| 2016/0134088 A1 * | 5/2016 | Faulkner | .................. | H02B 1/28 361/605 |

\* cited by examiner

*Primary Examiner* — Courtney Smith
(74) *Attorney, Agent, or Firm* — Eckert Seamans; David Jenkins; Philip Levy

(57) ABSTRACT

A housing assembly for a network transformer primary disconnect assembly is provided. The housing assembly includes a visible break assembly and a number of sidewalls defining an enclosed space. The visible break assembly includes a number of viewing windows in at least one sidewall. The viewing windows are aligned with one of a contact assembly interface or a movable contact assembly distal end in the open, first position.

10 Claims, 9 Drawing Sheets

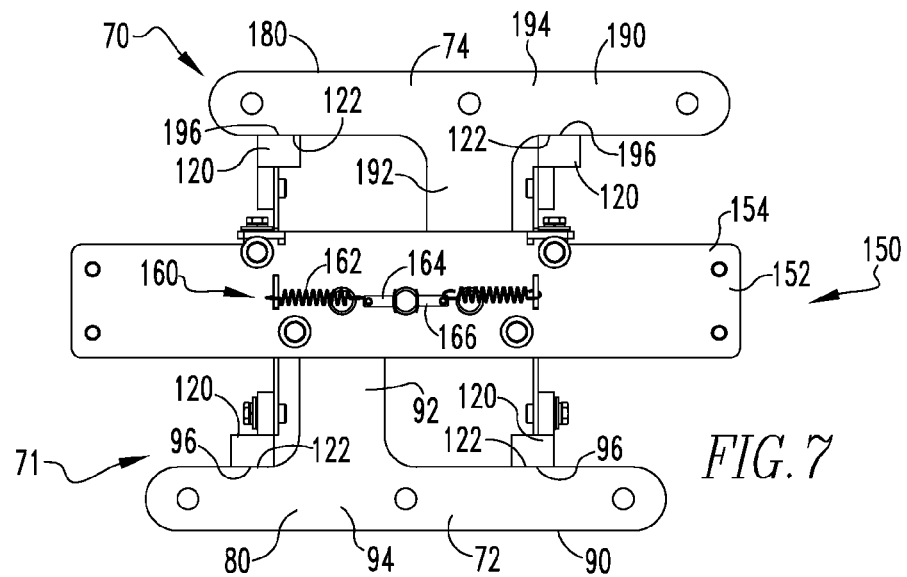
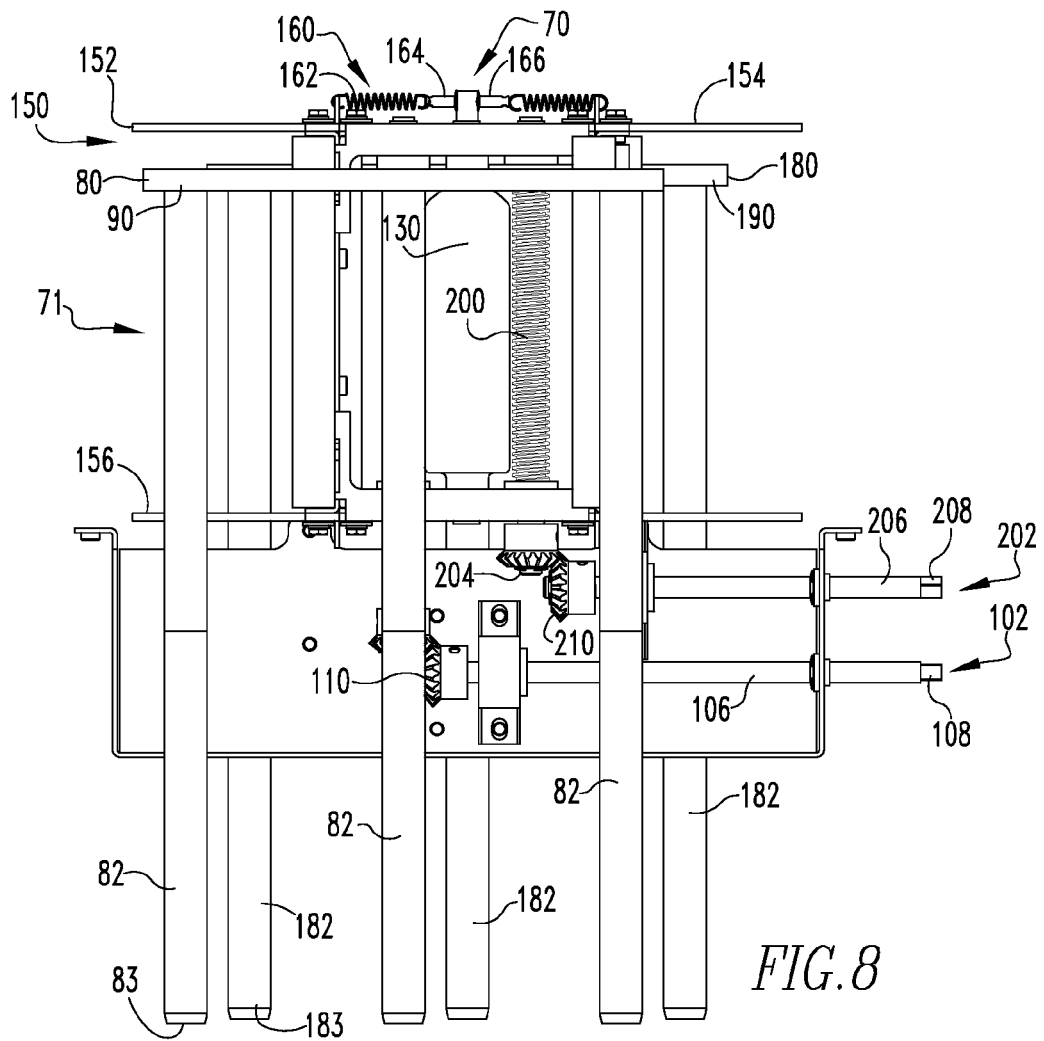

NETWORK TRANSFORMER PRIMARY DISCONNECT ASSEMBLY

BACKGROUND OF THE INVENTION

Field of the Invention

The disclosed and claimed concept relates to a network transformer primary disconnect assembly and, more particularly, to an housing assembly for a network transformer primary disconnect assembly with a visible break assembly and visible grounding assembly.

Background Information

A network transformer is, typically, paired with both a primary medium voltage disconnect and a low voltage network protector. These systems are commonly located below ground level and must be submersible. Upstream of the network transformer and other components located below ground level, i.e. On the line side of the circuit, is a medium voltage distribution switchgear. Typically, the associated network transformer disconnect is non-loadbreak and is not capable of withstanding fault currents. Thus, there is a need for a primary medium voltage disconnect that can withstand faults and interrupt rated load as well as fault load. The need to obtain the fault withstand, and load interrupting ratings, can be addressed by including an available medium voltage vacuum circuit breaker in the submersible enclosure. This solution, however, creates additional needs.

In this configuration, the primary medium voltage disconnect includes a medium voltage vacuum circuit breaker and a visible isolation/ground assembly. During maintenance, however, the primary medium voltage disconnect must be grounded so as to ground the upstream medium voltage distribution switchgear. An interlock assembly is needed to ensure that the primary medium voltage disconnect cannot be coupled to both the medium voltage vacuum circuit breaker and the ground conductor assembly at the same time.

Further, so that maintenance workers can quickly determine if the primary medium voltage disconnect is in a safe condition, the submersible housing assembly needs to be able to reveal the configuration of the primary medium voltage disconnect.

SUMMARY OF THE INVENTION

These needs, and others, are met by at least one embodiment of this invention which provides for a housing assembly for a network transformer primary disconnect assembly that includes a visible break and visible ground assembly. That is, the housing assembly includes a number of sidewalls defining an enclosed space. The visible break assembly includes a number of viewing windows in at least one sidewall. The viewing windows are aligned with one of a contact assembly interface or a movable contact assembly distal end in the open, first position.

BRIEF DESCRIPTION OF THE DRAWINGS

A full understanding of the invention can be gained from the following description of the preferred embodiments when read in conjunction with the accompanying drawings in which:

FIG. 7 is a top view of an interlock assembly.
FIG. 8 is a side view of an interlock assembly.

DESCRIPTION OF THE PREFERRED EMBODIMENTS

Figure 1:
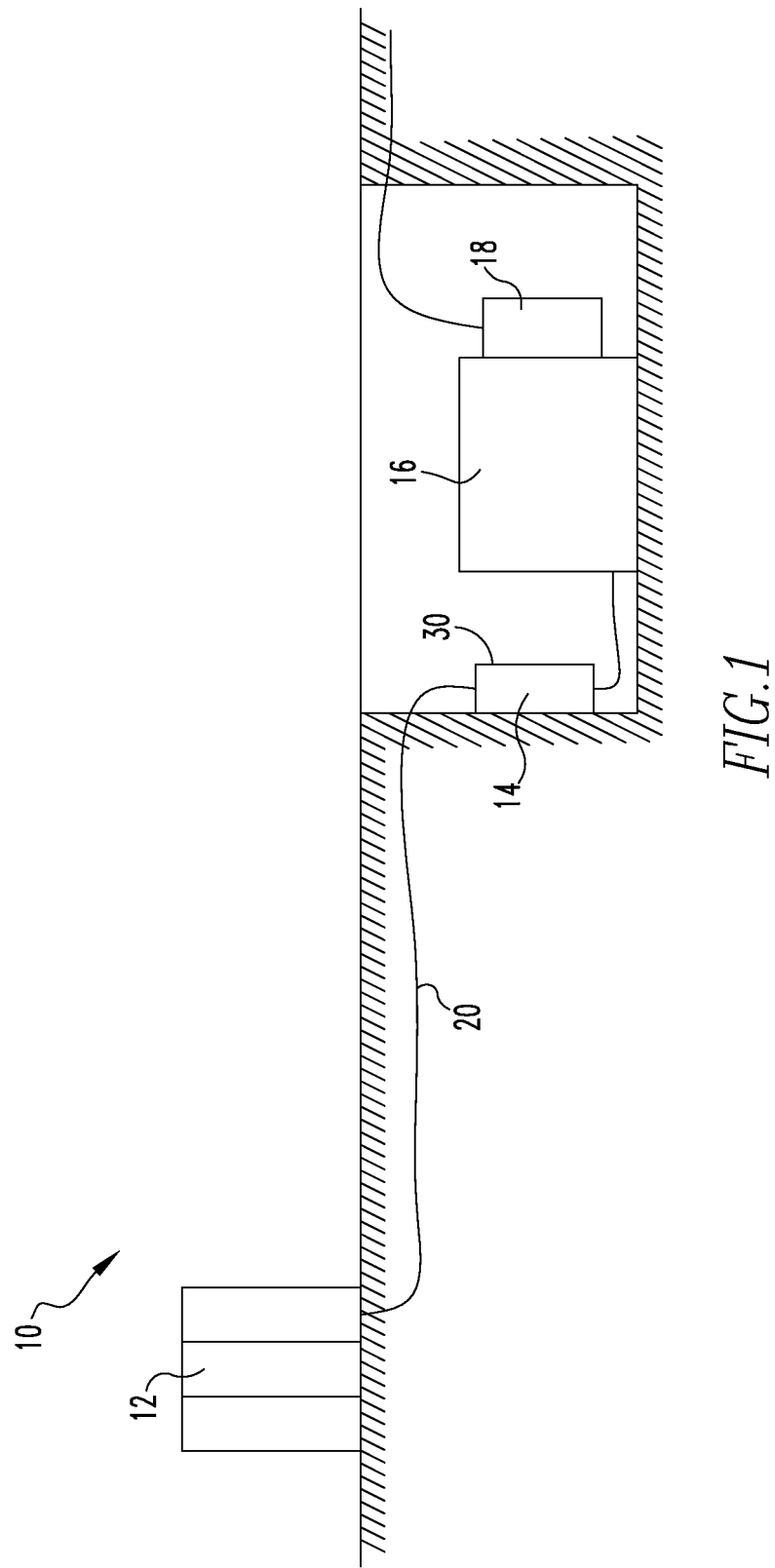
FIG. 1 is a schematic view of an electrical system.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. It is noted that moving parts, such as but not limited to circuit breaker contacts, are "directly coupled" when in one position, e.g. the closed, second position, but are not "directly coupled" when in the open, first position. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof.

As used herein, the phrase "removably coupled" means that one component is coupled with another component in an essentially temporary manner. That is, the two components are coupled in such a way that the joining or separation of the components is easy and would not damage the components. For example, two components secured to each other with a limited number of readily accessible fasteners are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are said to fit "snugly" together or "snuggly correspond." In that situation, the difference between the size of the components is even smaller whereby the amount of friction increases. If the element defining the opening and/or the component inserted into the opening is made from a deformable or compressible material, the opening may even be slightly smaller than the component being inserted into the opening. This definition is further modified if the two components are said to "substantially correspond." "Substantially correspond" means that the size of the opening is very close to the size of the element inserted therein; that is, not so close as to cause substantial friction, as with a snug fit, but with more contact and friction than a "corresponding fit," i.e., a "slightly larger" fit.

As used herein, the statement that two or more parts or components "engage" one another shall mean that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "coupled" to the screw. If an axial force is applied to the screwdriver, the screwdriver is pressed against the screw and "engages" the screw. However, when a rotational force is applied to the screwdriver, the screwdriver operatively engages the screw and causes the screw to rotate.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true.

As used herein, the word "unitary" means a component is created as a single piece or unit. That is, a component that includes pieces that are created separately and then coupled together as a unit is not a "unitary" component or body.

As used herein, the term "number" shall mean one or an integer greater than one (i.e., a plurality).

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, "submersible" when used in reference to a housing assembly means that the housing assembly is substantially resistant to liquid infiltration.

As used herein, a "window" on a submersible housing assembly means a construct that allows light to pass therethrough but which is substantially resistant to liquid infiltration. Thus, an uncovered opening, i.e. a hole is not a "window" as used herein because the uncovered opening is not substantially resistant to liquid infiltration. Further, for a window to be a construct that is substantially resistant to liquid infiltration, there must be some indication that the construct resists water infiltration; an indication that a window simply closes is also not a "window" as used herein. That is, a window that simply closes does not have an indication that the construct resists water infiltration.

As used herein "substantially resistant to liquid infiltration" means exposure to about 3 meters of head water above the top of the enclosure for 24 hours without leaks. This generally corresponds to 35 kPa or 5 psi external pressure.

Further, and as used herein, a "viewing window" has a field of view. The field of view is that which is easily visible through the window when viewed from a distance of at least one foot and generally normal to the window surface; that is, the viewer cannot be immediately adjacent the window.

Further, as used herein, a "viewing window" is aligned with movable mechanical construct that is within the field of view. That is, for example, a window in a fluid conduit is not a "viewing window" because such a window does not have a movable mechanical construct within the field of view. It is further noted that the "viewing window" does not lose its status as a "viewing window" when the movable mechanical construct moves out of the field of view. That is, if at any time a movable mechanical construct is within the field of view of the window, it is a "viewing window" for that movable mechanical construct.

As used herein, a "contact assembly" includes a conductive member and a conductive coupling. The conductive member is coupled to, and in electrical communication with, the conductive coupling. The conductive coupling is structured to be selectively coupled to, and in electrical communication with, another conductive coupling. For example, a conductive coupling includes, but is not limited to, a disk that is structured to engage another disk. As another example, a conductive coupling includes a resilient spring-like clamp into which a planar member (a stab) is inserted.

As used herein, a "pair of contact assemblies" or "pair of <name> contact assemblies" means a first contact assembly and a second contact assembly wherein the first and second contact assemblies move between two positions, a first position, wherein the contact assemblies are separated and are not in electrical communication, and a second position wherein the contact assemblies are coupled, or directly coupled, and are in electrical communication. One or both of the contact assemblies are movable. That is, one contact assembly may be fixed and only the other contact assembly moves between the first and second position.

As used herein, a "camming surface" is a surface that is structured to, and does, engage another element and moves the element or is moved thereby. A surface that is merely capable of engaging another element but does not actually do so is not a "camming surface."

As shown in FIG. 1, an electrical system 10 includes a medium voltage distribution switchgear 12, a network transformer primary disconnect assembly 14, a transformer 16, and a network protector 18. These elements are coupled to, and in electrical communication with, each other via a conductor 20 such as, but not limited to a cable. That is, in an exemplary embodiment, the medium voltage distribution switchgear 12 is coupled to, and in electrical communication with, the network transformer primary disconnect assembly 14. The network transformer primary disconnect assembly 14 is coupled to, and in electrical communication with, transformer 16. The transformer 16 is coupled to, and in electrical communication with, network protector 18. Further, the medium voltage distribution switchgear 12 is coupled to, and in electrical communication with, a source of power (a line), not shown. The network protector 18 is coupled to, and in electrical communication with, a low voltage network (a load).

As shown in FIGS. 2-6, the network transformer primary disconnect assembly 14 includes a housing assembly 30, a number of electrical components 40, and an interlock assembly 70. The housing assembly 30 includes a number of sidewalls 32 that define an enclosed space 31. The housing assembly 30 is submersible. That is, as is known, various openings through which conductors extend are sealed so as to substantially resist infiltration by liquids. Further, various openings, such as but not limited to selectively removable doors, are also sealed so as to substantially resist infiltration by liquids. In an exemplary embodiment, the housing assembly 30 includes six generally planar sidewalls 32 disposed as a parallelepiped. That is, the housing assembly sidewalls 32 include a generally vertical front, first sidewall 32A, rear sidewall 32B a lateral, second sidewall 32C, as well as an opposing lateral sidewall 32D, a generally horizontal top sidewall 32E and a bottom sidewall 32F.

The housing assembly 30 also includes a conductor assembly 34 having a number of conductive members 36. The number of conductive members 36 include line members 37 and load members 38. The line members 37 and load members 38 extend through the housing assembly sidewalls 32 and are coupled to and in electrical communication with the medium voltage distribution switchgear 12 and the network protector 18, respectively. The number of conductive members 36 further includes a number of slidable conductive couplings 39. In an exemplary embodiment, the slidable conductive couplings 39 are circular collars 39A through which the operation contact assemblies 82 and the ground contact assemblies 182, both described below, slide. The slidable conductive couplings 39 are in electrical communication with the elements slidably disposed therein. The slidable conductive couplings 39, in an exemplary embodiment, include conductive tubular collars and conductive coils (not shown). The tubular collars have a number of groves (not shown) disposed on the inner surface thereof. The conductive coils, which in an exemplary embodiment are resilient and spring-like, are shaped into a loop and disposed within the grooves. The inner cross-sectional area of the tubular collars is greater than the cross-sectional area of the conductive members 36. The inner cross-sectional area of the conductive coils loops is slightly less than the cross-sectional area of the conductive members 36. In this configuration, as the conductive members 36 pass through the tubular collars, the conductive coils are compressed and create a electrical coupling between the conductive members 36 and the tubular collars. See e.g. U.S. Pat. No. 8,804,372 The housing assembly 30 is discussed in more detail below.

The number of electrical components 40 includes a circuit interrupter 42 and an interlock assembly 70. In an exemplary embodiment, the circuit interrupter 42 is a medium voltage vacuum circuit breaker 44. The circuit interrupter 42 includes a number of contact assemblies 46 that are structured to be, and are, selectively coupled to the interlock assembly movable contact assemblies 54, discussed below. As shown, the circuit interrupter contact assemblies 46 are not movable; i.e. the circuit interrupter contact assemblies 46 are fixed. In an exemplary embodiment, the circuit interrupter contact assemblies 46 include a conductive cup-like body 43 having a base 45 and a number of flexible, upwardly depending fingers 47. The cup-like body 43 defines a contact assembly enclosed space 49.

It is understood that the circuit interrupter 42, such as a medium voltage vacuum circuit breaker 44, includes a number of internal contact assemblies 48 that are structured to separate during an over-current condition. The remainder of this discussion, however, relates to the circuit interrupter contact assemblies 46 that are structured to be, and are, selectively coupled to the interlock assembly movable contact assemblies 54. Further, the interlock assembly 70 may be disposed on either the line side or the load side of the circuit interrupter 42. In the exemplary embodiment shown, the interlock assembly 70 is disposed on the line side of the circuit interrupter 42. In this configuration, the network transformer primary disconnect assembly 14 is structured to ground the medium voltage distribution switchgear 12. It is noted that the medium voltage distribution switchgear 12 is de-energized prior to grounding. In an embodiment wherein the interlock assembly 70 is disposed on the load side of the circuit interrupter 42, not shown, the network transformer primary disconnect assembly 14 is structured to ground the transformer 16.

It is further understood that the circuit interrupter 42 includes a number of contact assemblies 46 on both the line side and the load side of the internal contact assemblies 48. The following discussion addresses only those circuit interrupter contact assemblies 46 that are structured to be, and are, coupled to and in electrical communication with the interlock assembly 70. The circuit interrupter contact assemblies 46 that are structured to be, and are, coupled to and in electrical communication with the interlock assembly 70 may be either the line or the load circuit interrupter contact assemblies 46 depending upon whether the network transformer primary disconnect assembly 14 is structured to ground the medium voltage distribution switchgear 12 or the transformer 16, as described above. In an exemplary embodiment as shown, the line side circuit interrupter contact assemblies 46 are used.

The circuit interrupter contact assemblies 46 include a number of operation contact assemblies 50 and a number of ground contact assemblies 52. As used herein, the contact assemblies 50, 52 on the circuit interrupter 42 are identified as "circuit interrupter operation contact assemblies 50" or "circuit interrupter ground contact assemblies 52." As set forth below, the operation assembly operation contact assemblies 82 are identified as "operation contact assemblies 82" and the ground assembly operation contact assemblies 182 are identified as "ground contact assemblies 82."

In an exemplary embodiment, the circuit interrupter 42 is a three-pole circuit interrupter 42; accordingly, in the embodiment shown, there are three circuit interrupter operation contact assemblies 50 and three circuit interrupter ground contact assemblies 52. The circuit interrupter "operation" contact assemblies 50 are coupled to, and in electrical communication with, the internal contact assemblies 48. The circuit interrupter "operation" contact assemblies 50 are the circuit interrupter contact assemblies 46 used during normal operation of the electrical system 10. The circuit interrupter "ground" contact assemblies 52 are each coupled to, and in electrical communication with a ground (not shown). The circuit interrupter "ground" contact assemblies 52 are the circuit interrupter contact assemblies 46 used during maintenance operations, and other operations, of the electrical system 10. The circuit interrupter operation contact assemblies 50 and the circuit interrupter ground contact assemblies 52 are also, as used herein, part of the interlock assembly 70.

As shown in FIGS. 7-10, the interlock assembly 70 includes a mechanical interlock assembly 71 and an electrical interlock assembly (not shown). The electrical interlock assembly includes sensors (not shown) that track the positions of the circuit breaker internal contact assemblies 48 as well as other electrical elements and prevents the operation contact assemblies 82 and ground contact assemblies 182, discussed below, in the second position simultaneously. The mechanical interlock assembly 71 includes an operation assembly 72, a ground assembly 74, and a blocking member assembly 76.

The operation assembly 72 includes a movable operation contact carriage assembly 80, a carriage drive assembly 81, and a number of operation contact assemblies 82. Each operation assembly operation contact assembly 82 (hereinafter "operation contact assembly" 82) has an associated circuit interrupter operation contact assembly 50. Stated alternately, the operation assembly 72 includes a number of pairs of operation contact assemblies 84. That is, each pair of operation contact assemblies 84 includes a circuit interrupter operation contact assembly 50 and an associated operation assembly operation contact assembly 82. Each operation contact assembly 82 moves between a first position, wherein the operation contact assembly 82 is spaced from, and not in electrical communication with, the associated circuit interrupter operation contact assembly 50, and a second position, wherein the operation contact assembly 82 is coupled or directly coupled to, and in electrical communication with, the associated circuit interrupter operation contact assembly 50. In an exemplary embodiment, each operation assembly operation contact assembly 82 is an elongated, generally cylindrical rod sized to correspond to the circuit interrupter contact assemblies enclosed space 49.

The operation contact carriage assembly 80 includes, in an exemplary embodiment, a body 90 having an elongated first portion 92 and an elongated second portion 94. The operation contact carriage body first portion 92 and the operation contact carriage body second portion 94 are disposed generally perpendicular to each other. As shown, the operation contact carriage assembly operation contact carriage body 90 (or "operation contact carriage" 90) has a T-shaped configuration. In an exemplary embodiment, the operation contact carriage 90 is generally planar. As shown, the planar operation contact carriage 90 is movable disposed in the housing assembly 30 with the plane of the operation contact carriage 90 extending generally horizontally. Further, each operation assembly operation contact assembly 82 extends generally vertically and downwardly from the operation contact carriage 90. The operation contact carriage assembly 80, in an exemplary embodiment, includes insulating members (not shown) between the operation contact carriage 90 and each operation assembly operation contact assembly 82. In an exemplary embodiment, the operation contact carriage 90 includes a threaded drive passage 95 and a number of guide surfaces 96. The operation contact carriage body drive passage 95 and guide surfaces 96 interact with the operation assembly carriage drive assembly 81.

The operation contact carriage 90 is movably disposed in the housing assembly 30. The operation contact carriage 90 is moved by the operation assembly carriage drive assembly 81. In an exemplary embodiment, the operation assembly carriage drive assembly 81 includes a threaded rod 100 and a drive linkage 102. The operation assembly carriage drive assembly threaded rod 100 is sized and threaded to correspond to the operation contact carriage body drive passage 95. As shown, and in an exemplary embodiment, the operation assembly carriage drive assembly threaded rod 100 is rotatably coupled to the housing assembly 30 and extends generally vertically. Further, in this exemplary embodiment, the lower end of the operation assembly carriage drive assembly threaded rod 100 includes a miter gear 104. In an exemplary embodiment, the operation assembly carriage drive assembly drive linkage 102 includes an elongated rod 106, a tool coupling 108 and a miter gear 110.

The housing assembly 30 includes a number of guide members 120. The housing assembly guide members 120 include vertically extending guide surfaces 122. In an exemplary embodiment, the housing assembly guide members 120 include elongated members that are disposed generally vertically within, and are coupled to, the housing assembly 30. The housing assembly guide members 120 are disposed adjacent the operation contact carriage 90 and are structured to maintain the operation contact carriage 90 in a generally vertical path as discussed below. In another embodiment, not shown, the operation contact carriage 90 includes a number of passages and the housing assembly guide members 120 are elongated rods that correspond to, and pass through, the passages.

The operation assembly 72 is assembled as follows. Each operation assembly operation contact assembly 82 is coupled, directly coupled, or fixed to the operation contact carriage 90 and extend generally vertically and downwardly therefrom. Thus, each operation contact assembly 82 includes a distal portion 83 located opposite the operation contact carriage 90. The operation contact carriage 90 is threadably coupled to the operation assembly carriage drive assembly threaded rod 100. The operation contact carriage 90 is further positioned with the operation contact carriage body guide surfaces 96 abutting, and slidably engaging, the housing assembly guide members 120. The operation assembly carriage drive assembly drive linkage 102 is rotatably coupled to the housing assembly 30 with the operation assembly carriage drive assembly drive linkage tool coupling 108 disposed outside the housing assembly 30 and the operation assembly carriage drive assembly drive linkage miter gear 110 operatively engaging the operation assembly carriage drive assembly threaded rod miter gear 104. In this configuration, rotation of the operation assembly carriage drive assembly drive linkage rod 106, e.g. by a tool (not shown) engaging the operation carriage drive assembly drive linkage tool coupling 108, causes the operation contact carriage 90 to move between an upper, first position, and a lower, second position. Engagement of the operation contact carriage body guide surfaces 96 and the housing assembly guide members 120 maintain the operation contact carriage 90 in a substantially constant orientation. That is, the operation contact carriage 90 translates (i.e. moves with a constant orientation) between the first and second positions. The space occupied by the operation contact carriage 90 as it moves is, as used herein, the "path of travel" or "path."

Further, each operation assembly operation contact assembly 82 is aligned with an associated circuit interrupter operation contact assembly 50. Thus, as the operation contact carriage 90 moves between the first and second positions, each operation assembly operation contact assembly 82 moves between an open, first position, wherein the operation assembly operation contact assembly 82 is spaced from the associated circuit interrupter operation contact assembly 50, and a closed, second position, wherein the operation assembly operation contact assembly 82 is coupled to, and in electrical communication with, the associated circuit interrupter operation contact assembly 50.

The ground assembly 74 is similar to the operation assembly 72. That is, the ground assembly 74 includes a movable ground contact carriage assembly 180, a carriage drive assembly 181, and a number of ground contact assemblies 182. Each ground assembly ground contact assembly 182 (hereinafter "ground contact assembly" 182) has an associated circuit interrupter ground contact assembly 52. Stated alternately, the ground assembly 74 includes a number of pairs of ground contact assemblies 184. That is, each pair of ground contact assemblies 184 includes a circuit interrupter ground contact assembly 52 and an associated ground assembly ground contact assembly 182. Each ground contact assembly 182 moves between a first position, wherein the ground contact assembly 182 is spaced from, and not in electrical communication with, the associated circuit interrupter ground contact assembly 52, and a second position, wherein the ground contact assembly 182 is coupled or directly coupled to, and in electrical communication with, the associated circuit interrupter ground contact assembly 52. In an exemplary embodiment, each ground assembly ground contact assembly 182 is an elongated, generally cylindrical rod sized to correspond to the circuit interrupter contact assemblies enclosed space 49.

The ground contact carriage assembly 180 includes, in an exemplary embodiment, a body 190 having an elongated first portion 192 and an elongated second portion 194. The ground contact carriage body first portion 192 and the ground contact carriage body second portion 194 are disposed generally perpendicular to each other. As shown, the contact carriage assembly ground contact carriage body 190 (or "ground contact carriage" 190) has a T-shaped configuration. In an exemplary embodiment, the ground contact carriage 190 is generally planar. As shown, the planar the ground contact carriage 190 is movable disposed in the housing assembly 30 with the plane of the ground contact carriage 190 extending generally horizontally. Further, each ground assembly ground contact assembly 182 extends generally vertically and downwardly from the ground contact carriage 190. The ground contact carriage assembly 180, in an exemplary embodiment, includes insulating members (not shown) between the ground contact carriage 190 and each ground assembly operation contact assembly 182. In an exemplary embodiment, the ground contact carriage body 90 includes a threaded drive passage 195 and a number of guide surfaces 196. The ground contact carriage body drive passage 195 and guide surfaces 196 interact with the ground assembly carriage drive assembly 18181.

The ground contact carriage 190 is movably disposed in the housing assembly 30. The ground contact carriage 190 is moved by the ground assembly carriage drive assembly 181. In an exemplary embodiment, the ground assembly carriage drive assembly 181 includes a threaded rod 200 and a drive linkage 202. The ground carriage drive assembly threaded rod 200 is sized and threaded to correspond to the ground contact carriage body drive passage 195. As shown, and in an exemplary embodiment, the ground carriage drive assembly threaded rod 200 is rotatably coupled to the housing assembly 30 and extends generally vertically. Further, in this exemplary embodiment, the lower end of the ground carriage drive assembly threaded rod 200 includes a miter gear 204. In an exemplary embodiment, the ground assembly carriage drive assembly drive linkage 202 includes an elongated rod 206, a tool coupling 208 and a miter gear 210.

As noted above, the housing assembly 30 includes a number of guide members 120. The housing assembly guide members 120 are also disposed adjacent the ground contact carriage 190 and are structured to maintain the ground contact carriage 190 in a generally vertical path as discussed below. In another embodiment, not shown, the ground contact carriage 190 includes a number of passages and the housing assembly guide members 120 are elongated rods that correspond to, and pass through, the passages.

The ground assembly 74 is assembled as follows. Each ground assembly ground contact assembly 182 is coupled, directly coupled, or fixed to the ground contact carriage 190 and extend generally vertically and downwardly therefrom. Thus, each ground contact assembly 182 includes a distal portion 183 located opposite the ground contact carriage 190. The ground contact carriage 190 is threadably coupled to the ground assembly carriage drive assembly threaded rod 200. The ground contact carriage 190 is further positioned with the ground contact carriage body guide surfaces 196 abutting, and slidably engaging, the housing assembly guide members 120. The ground assembly carriage drive assembly drive linkage 202 is rotatably coupled to the housing assembly 30 with the ground assembly carriage drive assembly drive linkage tool coupling 208 disposed outside the housing assembly 30 and the ground carriage drive assembly drive linkage miter gear 210 operatively engaging the ground assembly carriage drive assembly threaded rod miter gear 204. In this configuration, rotation of the ground assembly carriage drive assembly drive linkage rod 206, (e.g. by a tool (not shown) engaging the ground assembly carriage drive assembly drive linkage tool coupling 208, causes the ground contact carriage 190 to move between an upper, first position, and a lower, second position. Engagement of the ground contact carriage body guide surfaces 196 and the housing assembly guide members 120 maintain the ground contact carriage body 190 in a substantially constant orientation. That is, the ground contact carriage 190 translates (i.e. moves with a constant orientation) between the first and second positions. The space occupied by the ground contact carriage 190 as it moves is, as used herein, the "path of travel" or "path."

Further, each ground assembly ground contact assembly 182 is aligned with an associated circuit interrupter ground contact assembly 52. Thus, as the ground contact carriage 190 moves between the first and second positions, each ground assembly ground contact assembly 182 moves between an open, first position, wherein the ground assembly ground contact assembly 182 is spaced from the associated circuit interrupter ground contact assembly 52, and a closed, second position, wherein the ground assembly ground contact assembly 182 is coupled to, and in electrical communication with, the associated circuit interrupter ground contact assembly 52.

In this configuration, the operation assembly operation contact assemblies 82 and the ground assembly ground contact assemblies 182 all move relative to the fixed circuit interrupter operation contact assemblies 50 and the circuit interrupter ground contact assemblies 52. Accordingly, the term "movable contact assembly" 54 refers collectively to the operation assembly operation contact assemblies 82 and the ground assembly ground contact assemblies 182.

The blocking member assembly 76 is structured to ensure that only one of either the operation contact assemblies 82 or the ground contact assemblies 182 are in the second position at one time. In an exemplary embodiment, the blocking member assembly 76 includes a body 130, shown in FIGS. 11-14, with an obstruction portion 132 and a lacunar portion 134. As used herein, a "lacunar portion" is a missing portion; that is, the lacunar portion 134 is empty, but is defined by the maximum dimensions of the blocking member assembly body 130. That is, any space beyond the maximum dimensions of the blocking member assembly body 130 is not a "lacunar portion," but, a space within the maximum dimensions of blocking member assembly body 130 is a "lacunar portion."

Figure 14:
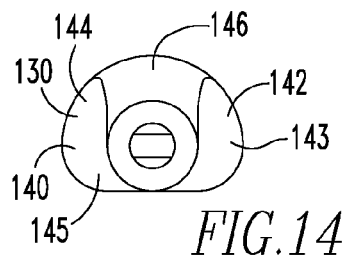
FIG. 14 is a top view of the blocking member assembly body.

In an exemplary embodiment, the blocking member assembly body 130 is elongated and has an axis of rotation. The blocking member assembly body obstruction portion 132 (hereinafter "obstruction portion" 132) is elongated and includes a generally D-shaped cross-section (FIG. 14). The blocking member assembly body 130 axis of rotation, in an exemplary embodiment, is disposed adjacent the center of the vertical stroke of the "D" shape. The blocking member assembly body 130 further includes an axle member 136. The axle member 136 is an elongated member having a generally circular cross-section. Further, the axle member 136 cross-sectional area is less than the blocking member assembly body obstruction portion 132. The blocking member assembly body 130 axis of rotation, in an exemplary embodiment, is disposed along the longitudinal axis of the axle member 136.

The maximum length of the blocking member assembly body 130 is the length of the elongated obstruction portion 132 and the elongated axle member 136. The obstruction portion 132 defines the maximum cross-sectional dimensions of the blocking member assembly body 130. Accordingly, the maximum dimensions of the blocking member assembly body 130 are defined by the cross-sectional dimensions of the blocking member assembly body 130 and the overall length of the blocking member assembly body 130. Thus, the blocking member assembly body lacunar portion 134 (hereinafter "lacunar portion" 134) is the empty space disposed about the axle member 136. That is, the space disposed about the axle member 136 is within the maximum dimensions of the blocking member assembly body 130 but is empty. As the axle member 136, in this embodiment, defines the lacunar portion 134, the axle member 136 is identified as part of the lacunar portion 134. Further, in an exemplary embodiment, the obstruction portion 132 has a length generally corresponding to the length of the ground contact carriage 190 path.

Figure 13:
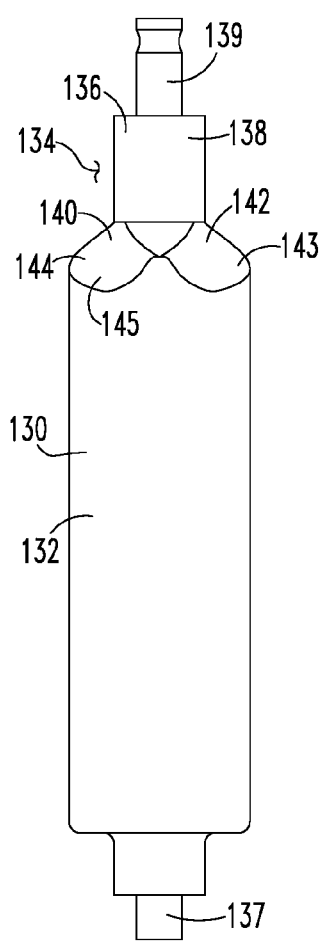
FIG. 13 is a front view of the blocking member assembly body.
Figure 12:
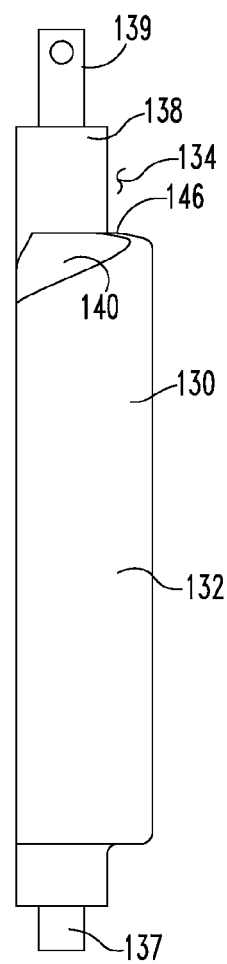
FIG. 12 is a side view of the blocking member assembly body.
Figure 11:
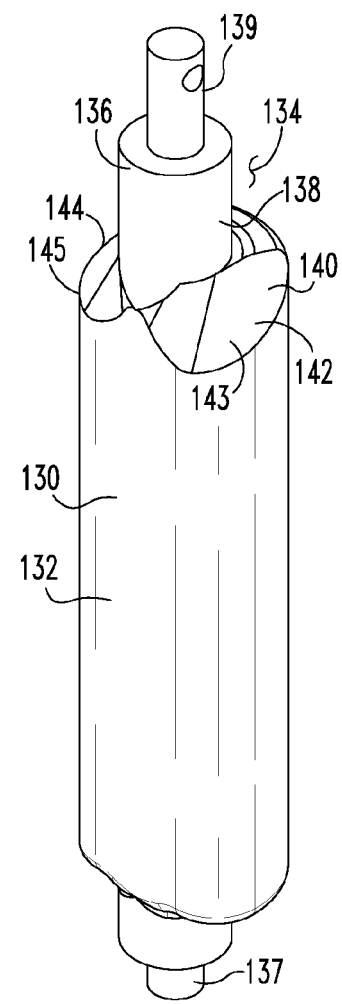
FIG. 11 is an isometric view of the blocking member assembly body.

As shown in FIGS. 11-13, the lacunar portion 134, and therefore the axle member 136, is disposed at the upper end of the obstruction portion 132. There is also a lower axle member 137 disposed at the lower end of the obstruction portion 132. As shown, and in an exemplary embodiment, both the axle member 136 and the lower axle member 137 are tiered constructs. That is, each of the axle member 136 and the lower axle member 137 have a wide radius portion 138 and a narrow radius portion 139.

Further, in this configuration, at the interface of the obstruction portion 132 and the lacunar portion 134, the obstruction portion 132 includes an axial surface 140. As used herein, an "axial surface" or "axial side" extends perpendicular to the longitudinal axis. The obstruction portion axial surface 140 includes a first helical portion 142 and a second helical portion 144. The obstruction portion axial surface first and second helical portions 142, 144 extend away from the lacunar portion 134 and have opposing directions. That is, as shown, the obstruction portion axial surface first helical portion 142 has a left hand direction and the obstruction portion axial surface second helical portion 144 has a right hand direction. That is, the twist of the first helical portion 142 and the second helical portion 144 are opposite of each other. In this configuration, the first helical portion 142 and the second helical portion 144 are structured to be, and are, camming surfaces 143, 145, as described below. In an exemplary embodiment, the obstruction portion axial surface 140 includes a flat 146, i.e. a surface that extends in a plane generally perpendicular to the blocking member assembly body 130 axis of rotation.

The blocking member assembly 76 further includes a support assembly 150. In an exemplary embodiment, the blocking member assembly support assembly 150 (hereinafter "support assembly" 150) includes two generally planar support member bodies 152. The support assembly support members bodies 152 are disposed in a spaced relationship. That is, there is an upper support member 154 and a lower support member 156. The plane of the support assembly support members bodies 152 extend generally horizontally. The support assembly support members bodies 152 are coupled to the housing assembly 30. In an exemplary embodiment, the support assembly support members bodies 152 include a generally circular axle passage 158.

The blocking member assembly 76 further includes a biasing assembly 160. The blocking member assembly biasing assembly 160 (hereinafter "biasing assembly" 160) is structured to bias the blocking member assembly body 130 to a neutral position, as described below. In an exemplary embodiment, the biasing assembly 160 includes a number of tension springs 162, two shown, and an elongated torque member 164. The torque member 164 includes an elongated body 166.

Figure 3:
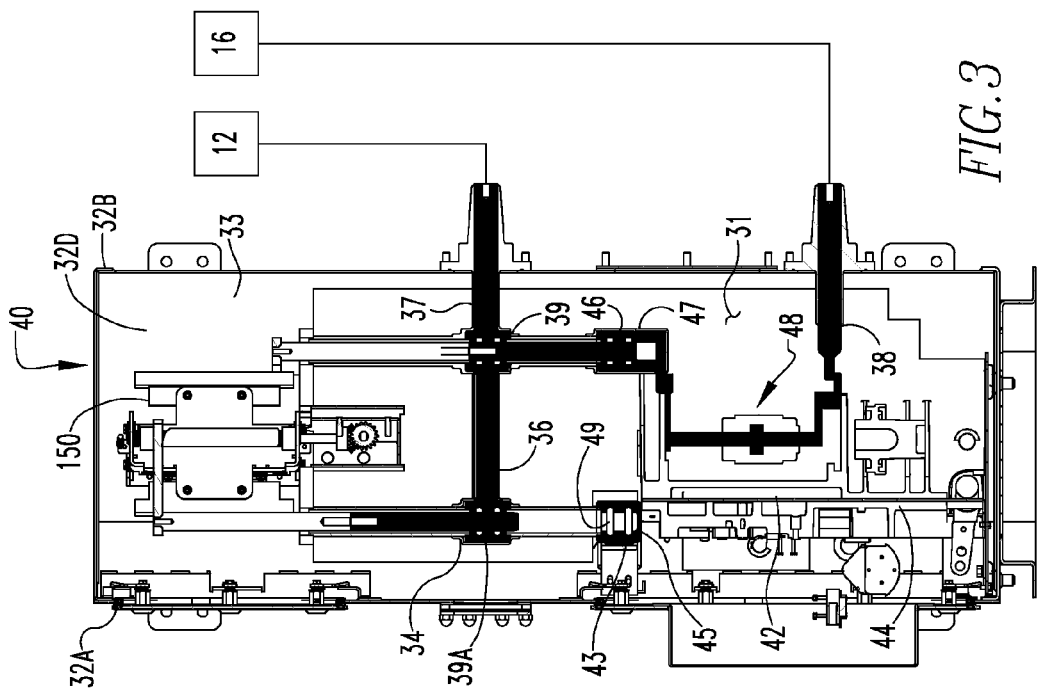
FIG. 3 is a cross-sectional side view of a circuit breaker and an interlock assembly in a housing assembly wherein the circuit breaker contact assemblies are in a second position, the interlock assembly operation contact assemblies are in a second position and the interlock ground contact assemblies are in a first position.
Figure 6:
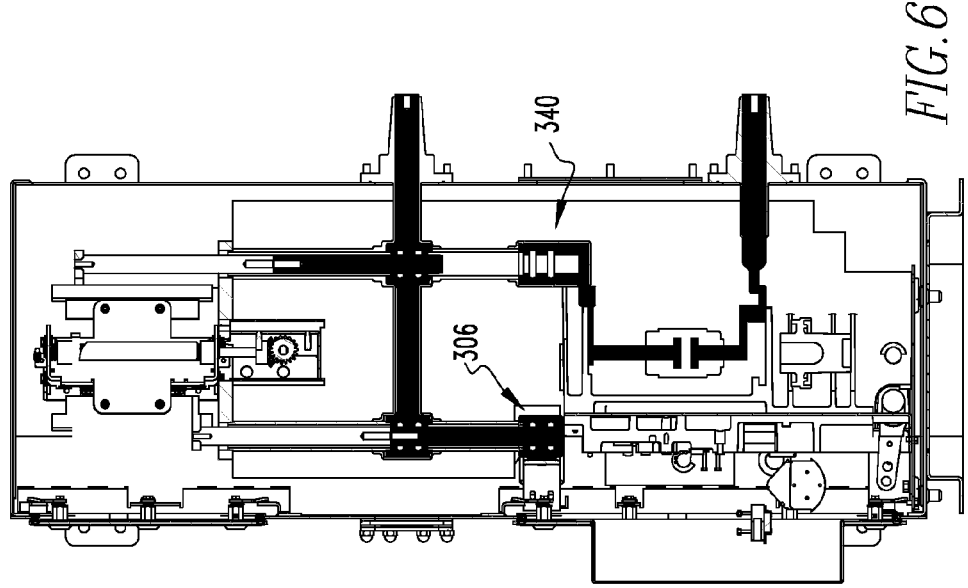
FIG. 6 is a cross-sectional side view of a circuit breaker and an interlock assembly in a housing assembly wherein the circuit breaker contact assemblies are in a first position, the interlock assembly operation contact assemblies are in a first position and the interlock ground contact assemblies are in a second position.
Figure 5:
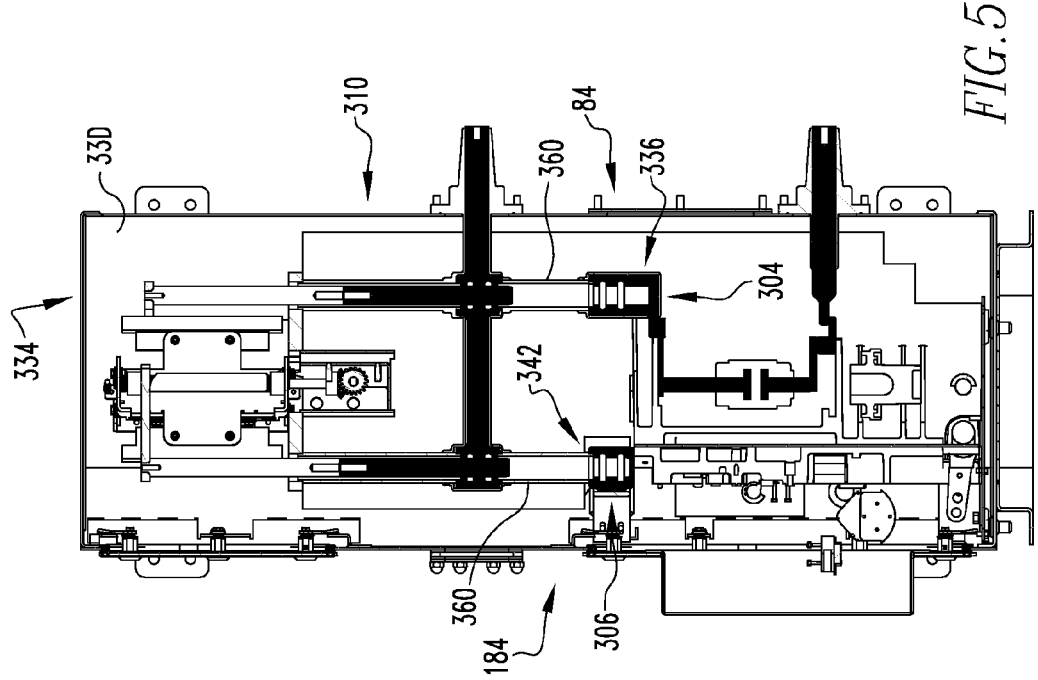
FIG. 5 is a cross-sectional side view of a circuit breaker and an interlock assembly in a housing assembly wherein the circuit breaker contact assemblies are in a first position, the interlock assembly operation contact assemblies are in a first position and the interlock ground contact assemblies are in a first position.
Figure 9:
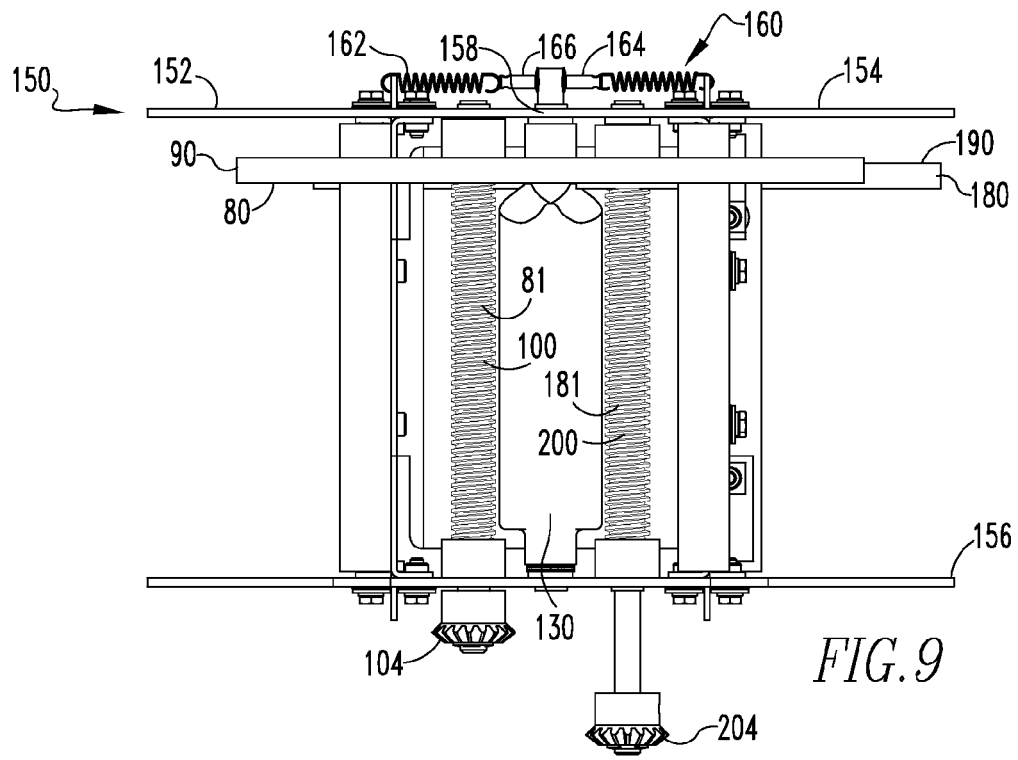
FIG. 9 is a side view of an interlock assembly with the contact assemblies removed.
Figure 10:
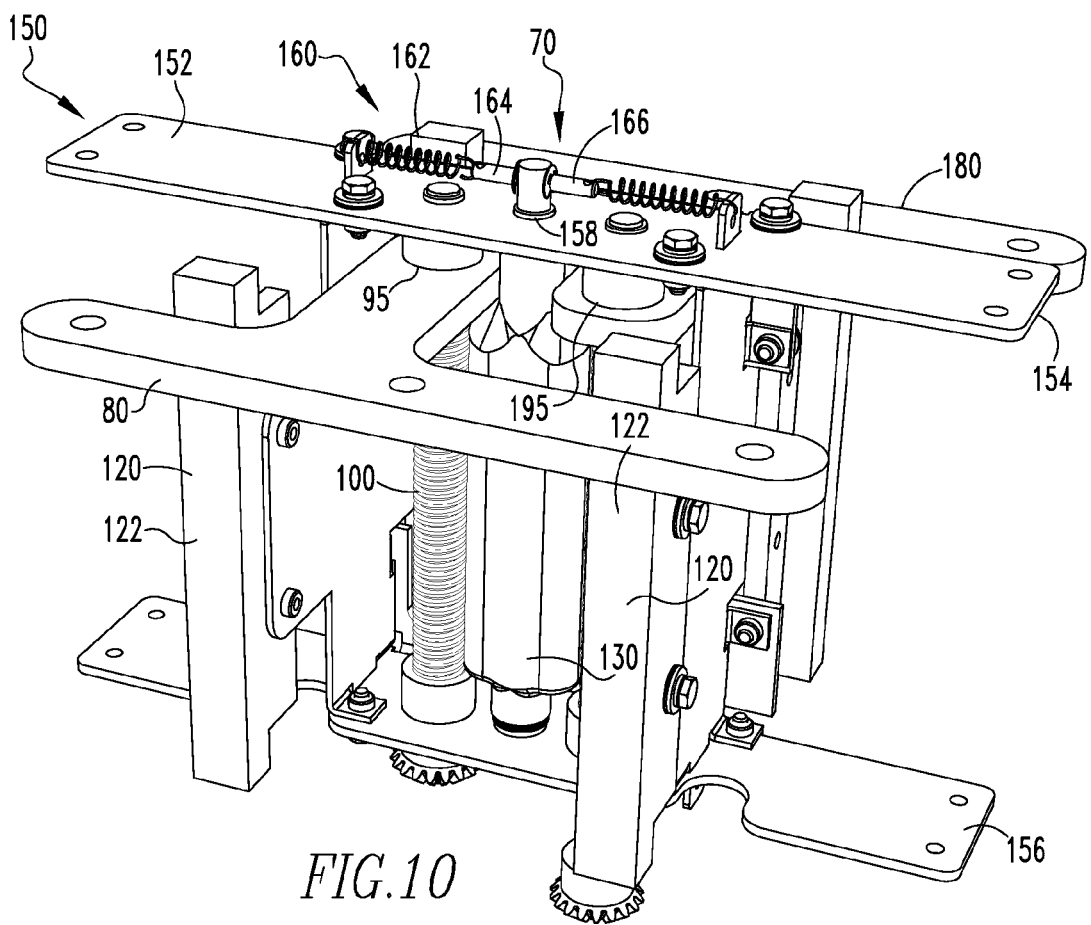
FIG. 10 is an isometric view of an interlock assembly with the contact assemblies removed.

The interlock assembly 70 is assembled as follows. The support assembly 150 is disposed within the housing assembly enclosed space 31 and is coupled, directly coupled, or fixed to the housing assembly 30. As shown in FIG. 3, the support assembly 150 is disposed above the circuit interrupter 42. The blocking member assembly body 130 is rotatably coupled to the support assembly 150. In an exemplary embodiment, the blocking member assembly body axle member 136 and the blocking member assembly body lower axle member 137 are rotatably disposed in the support assembly support member axle passages 158.

The biasing assembly 160 is disposed on the upper surface of the upper support member 154. That is, the elongated torque member 164 is coupled to, directly coupled to, or fixed to, the blocking member assembly body axle member 136 and extends generally perpendicular to the blocking member assembly body 130 axis of rotation. As shown, the torque member 164 is coupled to, directly coupled to, or fixed to, the axle member narrow radius portion 139 that extends above the upper surface of the upper support member 154. The biasing assembly tension springs 162 are coupled to the torque member 164 as well as the upper surface of the upper support member 154. In this configuration, the biasing assembly 160 is structured to bias the blocking member assembly body 130 to a neutral position, as described below.

The operation assembly 72 is disposed adjacent to the blocking member assembly body 130. That is, the operation contact carriage body first portion 92 is disposed immediately adjacent the blocking member assembly body 130. The operation assembly carriage drive assembly threaded rod 100 extends generally parallel to the blocking member assembly body 130 axis of rotation. Further, each operation assembly operation contact assembly 82 is slidably disposed through a slidable conductive coupling 39. Thus, the operation assembly operation contact assemblies 82 are coupled to, and in electrical communication with the medium voltage distribution switchgear 12 via the conductor assembly 34. Further, each operation assembly operation contact assembly 82 is aligned with an associated circuit interrupter operation contact assembly 50. Initially, the operation contact carriage 90 is in the first position with the operation contact carriage body first portion 92 disposed in the lacunar portion 134.

Similarly, the ground assembly 74 is also disposed adjacent to the blocking member assembly body 130. The ground assembly 74 is disposed in opposition, i.e. on the other side of the blocking member assembly body 130 axis of rotation, to the operation assembly 72. The ground contact carriage body first portion 192 is disposed immediately adjacent the blocking member assembly body 130. The ground assembly carriage drive assembly threaded rod 200 extends generally parallel to the blocking member assembly body 130 axis of rotation. Further, each ground assembly ground contact assembly 182 is slidably disposed through a slidable conductive coupling 39. Thus, the ground assembly ground contact assemblies 182 are coupled to, and in electrical communication with the medium voltage distribution switchgear 12 via the conductor assembly 34. Further, each ground assembly ground contact assembly 182 is aligned with an associated circuit interrupter contact ground contact assembly 52. Initially, the ground contact carriage 190 is in the first position with the ground contact carriage body first portion 192 disposed in the lacunar portion 134. Accordingly, when the movable operation contact carriage 90 is in the first position and the ground contact carriage 190 is in the first position, the operation contact carriage body first portion 92 and the ground contact carriage body first portion 192 are spaced, but extend generally parallel to each other.

In this configuration, the operation contact carriage 90 and the ground contact carriage 190 are structured to, and do, move in a generally vertical path adjacent the blocking member assembly body 130. Moreover, both the operation contact carriage 90 path and the ground contact carriage 190 path overlap the obstruction portion 132 when the blocking member assembly body 130 is in a neutral position. That is, the blocking member assembly body 130 is movable between a first position, wherein the blocking member assembly body obstruction portion 132 is disposed in the path of the ground contact carriage 190, a neutral position, wherein the blocking member assembly body obstruction portion 132 is disposed in the path of the operation contact carriage 90 and the ground contact carriage 190, and a second position, wherein the blocking member assembly body obstruction portion 132 is disposed in the path of the operation contact carriage 90.

Thus, the blocking member assembly body 130 is structured to, and does, allow only the operation contact carriage 90 or the ground contact carriage 190 to move into the second position. That is, when the blocking member assembly body 130 is in the neutral position, both the operation contact carriage 90 and the ground contact carriage 190 are in the second position and disposed in the lacunar portion 134. Moreover, the blocking member assembly body obstruction portion 132 is partially disposed in the path of both the operation contact carriage 90 and the ground contact carriage 190. Thus, neither the operation contact carriage 90 or the ground contact carriage 190 can move to the second position. When the blocking member assembly body 130 is in the neutral position, the first helical portion 142 is disposed in the operation contact carriage 90 path, and, the second helical portion 144 is disposed in the ground contact carriage 190 path.

When the blocking member assembly body 130 is in the first position, the blocking member assembly body 130 has rotated so that the vertical stroke of the "D" shaped blocking member assembly body obstruction portion 132 is disposed adjacent, i.e. is facing, the operation contact carriage 90. When the blocking member assembly body obstruction portion 132 is in this orientation, the blocking member assembly body obstruction portion 132 is not disposed in the operation contact carriage 90. Thus, the operation contact carriage 90 can move between the first and second positions. Further, when the blocking member assembly body obstruction portion 132 is in this orientation, the blocking member assembly body obstruction portion 132 is fully disposed in the path of the ground contact carriage 190. Thus, the ground contact carriage 190 cannot move into the second position.

Conversely, when the blocking member assembly body 130 is in the second position, the blocking member assembly body 130 has rotated so that the vertical stroke of the "D" shaped blocking member assembly body obstruction portion 132 is disposed adjacent, i.e. is facing, the ground contact carriage 190. When the blocking member assembly body obstruction portion 132 is in this orientation, the blocking member assembly body obstruction portion 132 is not disposed in the ground contact carriage 190. Thus, the ground contact carriage 190 can move between the first and second positions. Further, when the blocking member assembly body obstruction portion 132 is in this orientation, the blocking member assembly body obstruction portion 132 is fully disposed in the path of the operation contact carriage 90. Thus, the operation contact carriage 90 cannot move into the second position.

In an exemplary embodiment, not shown, the orientation of the blocking member assembly body obstruction portion 132 is controlled by a motor coupled to the axle member 136. In the embodiment shown, the orientation of the blocking member assembly body obstruction portion 132 is mechanically controlled. That is, movement of either the operation contact carriage 90 or the ground contact carriage 190 affects the orientation of the blocking member assembly body obstruction portion 132. For example, when the operation contact carriage 90 and the ground contact carriage 190 are in the second position and disposed in the lacunar portion 134, the blocking member assembly body 130 is in the neutral position. That is, as stated above, the biasing assembly 160 biases the blocking member assembly body 130 to a neutral position. That is, neither the operation contact carriage 90 nor the ground contact carriage 190 are contacting the blocking member assembly body 130, thus, the biasing assembly 160 biases the blocking member assembly body 130 to a neutral position.

When, for example, the operation contact carriage 90 moves to the second position (by actuating the operation assembly carriage drive assembly threaded rod 100), the operation contact carriage 90 contacts and engages the first helical portion 142. The engagement of the operation contact carriage 90 with the first helical portion 142 causes the blocking member assembly body 130 to rotate from the neutral position to the first position. That is, the cam action of the engagement of the operation contact carriage 90 with the first helical portion 142 overcomes the bias of the biasing assembly 160 and causes the blocking member assembly body 130 to rotate from the neutral position to the first position. As noted above, when the blocking member assembly body 130 is in this orientation, the ground contact carriage 190 cannot move into the second position. That is, if the ground contact carriage 190 attempts to move into the second position, the ground contact carriage 190 contacts and engages the obstruction portion axial surface 140, or the flat 146, and cannot move further toward the second position. Further, even when the ground contact carriage 190 engages a helical portion 142, 144, the blocking member assembly body 130 cannot rotate from the first position because any rotation is prevented by the blocking member assembly body 130 engaging the operation contact carriage 90.

Operation of the ground contact carriage 190 is similar. That is, when, for example, the ground contact carriage 190 moves to the second position (by actuating the ground assembly carriage drive assembly threaded rod 200), the ground contact carriage 190 contacts and engages the second helical portion 144. The engagement of the ground contact carriage 190 with the second helical portion 144 causes the blocking member assembly body 130 to rotate from the neutral position to the second position. That is, the cam action of the engagement of the ground contact carriage 190 with the second helical portion 144 overcomes the bias of the biasing assembly 160 and causes the blocking member assembly body 130 to rotate from the neutral position to the second position. As noted above, when the blocking member assembly body 130 is in this orientation, the operation contact carriage 190 cannot move into the second position. That is, if the operation contact carriage 90 attempts to move into the second position, the operation contact carriage 90 contacts and engages the obstruction portion axial surface 140, or the flat 146, and cannot move further toward the second position. Further, even when the operation contact carriage 90 engages a helical portion 142, 144, the blocking member assembly body 130 cannot rotate from the first position because any rotation is prevented by the blocking member assembly body 130 engaging the ground contact carriage 190.

Thus, the blocking member assembly body 130 is movable between the first position and the second position only when the movable operation contact carriage 90 is in the first position and the ground contact carriage 190 is in the first position, i.e. when the movable operation contact carriage 90 and the ground contact carriage 190 are both disposed in the lacunar portion 134.

Figure 2:
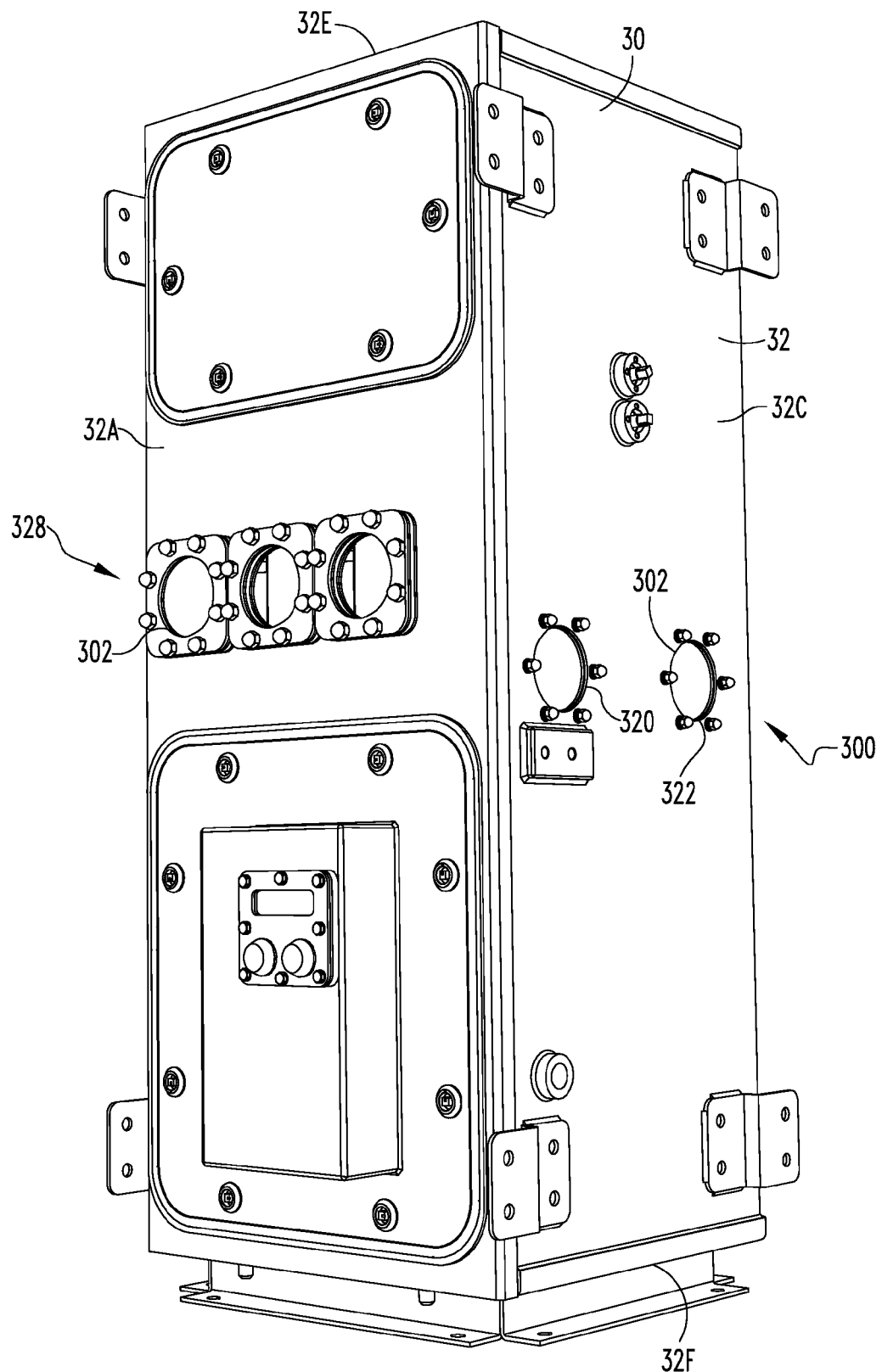
FIG. 2 is an isometric view of a housing assembly.
Figure 4:
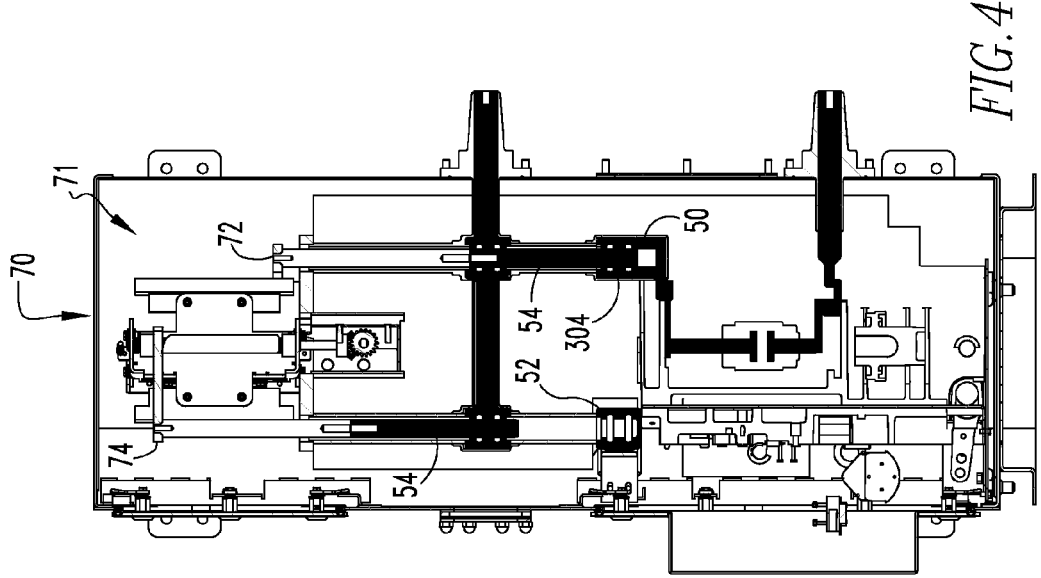
FIG. 4 is a cross-sectional side view of a circuit breaker and an interlock assembly in a housing assembly wherein the circuit breaker contact assemblies are in a first position, the interlock assembly operation contact assemblies are in a second position and the interlock ground contact assemblies are in a first position.
Figure 15:
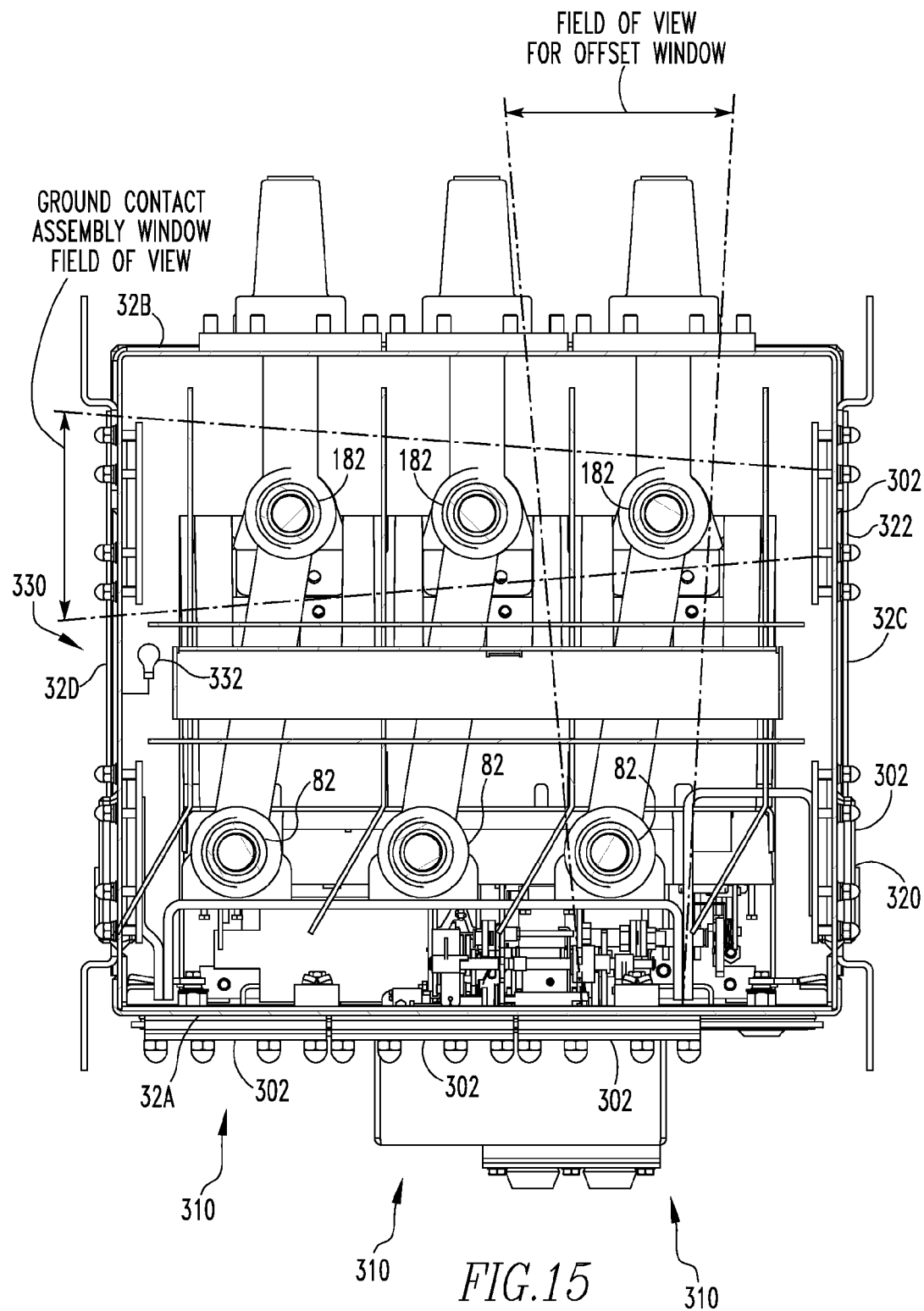
FIG. 15 is a top cross-sectional view of a housing assembly and portions of an interlock assembly.
Figure 16:
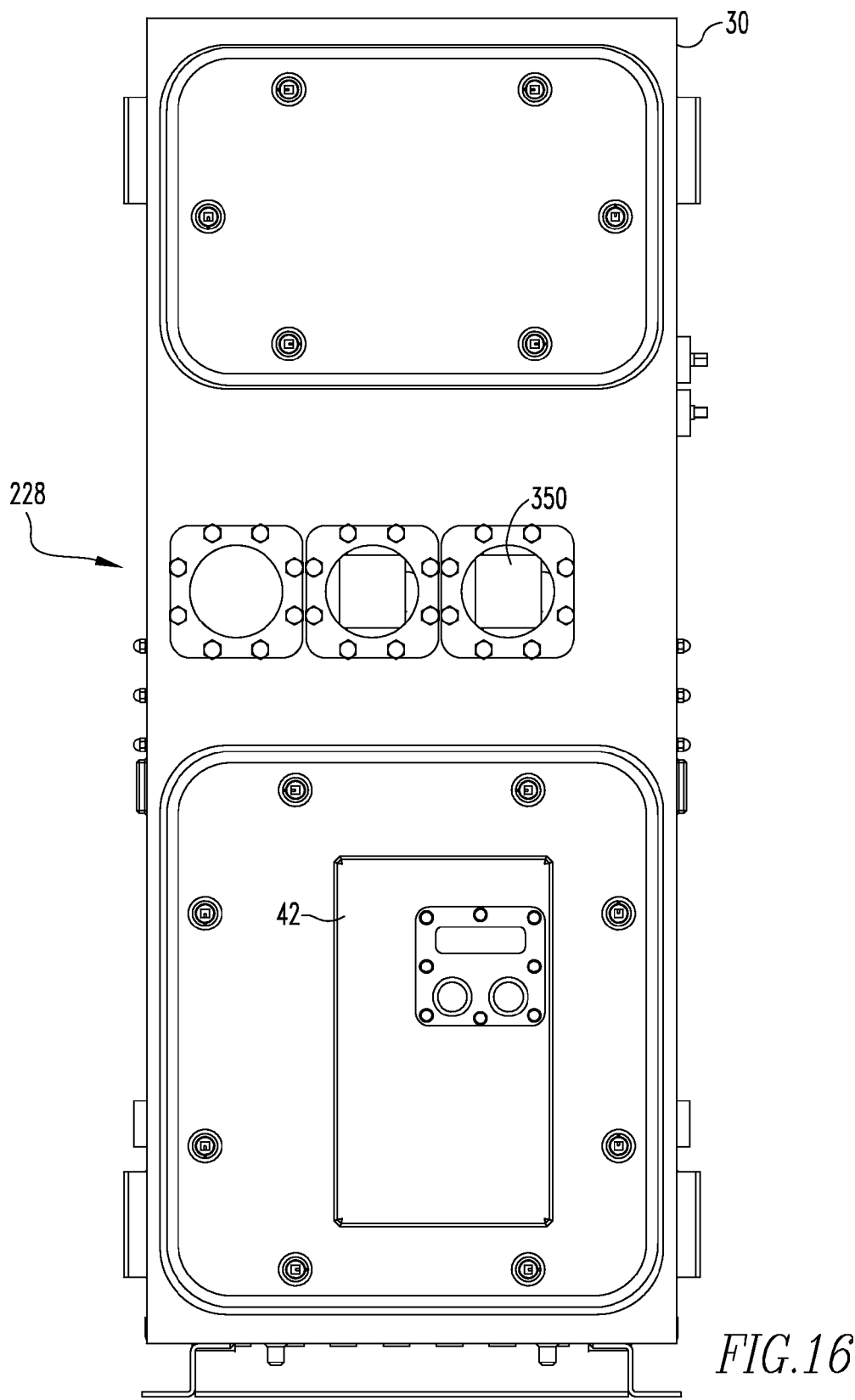
FIG. 16 is a front view of a housing assembly.

Further, the housing assembly 30 includes a visible break assembly 300, shown in FIGS. 2, 15 and 16. The visible break assembly 300 is structured to allow a user to see the position of the operation contact assemblies 82 and the ground contact assemblies 182. In an exemplary embodiment, the visible break assembly 300 includes a number of viewing windows 302 (FIG. 2) in at least one sidewall 32. As noted above, the housing assembly 30 is submersible. Thus, a "window," as defined above, is a construct that allows light to pass therethrough but which is substantially resistant to liquid infiltration. In an exemplary embodiment, the viewing windows 302 are aligned with one of a contact assembly interface, described below, or a movable contact assembly 54 in the open, first position.

That is, when a movable contact assembly 54 is in the second position, the movable contact assembly 54 and a circuit interrupter contact assembly 50, 52 meet at a "contact assembly interface." Thus, as used herein, a "contact assembly interface" is the location wherein the contact assemblies in a pair of operation contact assemblies 84 or a pair of ground contact assemblies 184 meet when in the second position. Thus, there are a number of operation contact assembly interfaces 304 (FIG. 4), wherein an operation contact assembly 84 meets a circuit interrupter operation contact assembly 50, and a number of ground contact assembly interfaces 306 (FIG. 6), wherein a ground contact assembly 184 meets a circuit interrupter ground contact assembly 52.

Further, as noted above, for each pair of operation contact assemblies 84 there is a pair of ground contact assemblies 184 associated with each pole of the circuit interrupter 42. As used herein a "set of movable contact assemblies" 310 (FIG. 15) means a pair of operation contact assemblies 84 and a pair of ground contact assemblies 184 associated with a pole of the circuit interrupter 42. That is, a "set of movable contact assemblies" 310 includes two pairs of movable contact assemblies 54.

Further, as noted above, in an exemplary embodiment, there are three pairs of operation contact assemblies 84 and three pairs of ground contact assemblies 184. That is, there are a number of. i.e. three sets of movable contact assemblies 54. The three pairs of operation contact assemblies 84 and three pairs of ground contact assemblies 184 are disposed in a matrix. As used herein, a "matrix" includes columns and generally perpendicular rows. In a configuration with three pairs of operation contact assemblies 84 and three pairs of ground contact assemblies 184, all the operation contact assemblies 84 are disposed in an "aligned column." That is, as used herein, an "aligned column" is a group of pairs of contact assemblies 84, 184 wherein a line passes generally through the longitudinal axes of each pair of contact assemblies 84, 184 in the column. Thus, in an exemplary embodiment, the three pairs of operation contact assemblies 84 are disposed in an aligned column; meaning that a line passes generally through the longitudinal axes of all the operation contact assemblies 84. Similarly, the three pairs of ground contact assemblies 184 are disposed in an aligned column; meaning that a line passes generally through the longitudinal axes of all the ground contact assemblies 184.

Conversely, in an exemplary embodiment, in a set of movable contact assemblies 310, the two pairs of movable contact assemblies 54 are offset. As is known, any two lines, e. g. the longitudinal axes of the two pairs of movable contact assemblies 54, can be crossed by a single third line. Accordingly, as used herein and as shown in FIG. 15, an "offset row" includes two pairs of movable contact assemblies 54 in a set of movable contact assemblies 310, as well as a viewing window 302 through which an element of both pairs of movable contact assemblies 54 are within the field of view. Further, an "offset row" means that a line cannot pass generally through the center of the viewing window 302 of the offset row and the longitudinal axes of an element of the two pairs of movable contact assemblies 54. Thus, when looking through the viewing window 302, both pairs of movable contact assemblies 54 are visible. This is true even if one of the pairs of movable contact assemblies 54 is partially obscured by the other pair.

In an exemplary embodiment, the visible break assembly 300 includes a number of operation contact assembly viewing windows 320 associated with the number of operation contact assemblies 82 as well as a number of ground contact assembly viewing windows 322 associated with the number of ground contact assemblies 182. That is, as used herein, an "operation contact assembly viewing window" 320 is a viewing window 302 wherein a number of operation contact assembly interfaces 304 are within the field of view of the "operation contact assembly viewing window" 320 while no ground contact assembly interfaces 306 are within the field of view of the "operation contact assembly viewing window" 320. Similarly, as used herein, a "ground contact assembly viewing window" 322 is a viewing window 302 wherein a number of ground contact assembly interfaces 306 are within the field of view of the "ground contact assembly viewing window" 322 (as shown in FIG. 15) while no operations contact assembly interfaces 304 are within the field of view of the "ground contact assembly viewing window" 322.

In an exemplary embodiment, the visible break assembly 300 includes a single operation contact assembly viewing window 320 and a single ground contact assembly viewing window 322. As shown in FIG. 2, the single operation contact assembly viewing window 320 and single ground contact assembly viewing window 322 are disposed on a housing assembly lateral sidewall 32C. In this position, the operation contact assembly viewing window 320 is aligned with the column of operation contact assemblies 84 at the operation contact assembly interfaces 304. That is, a line extending generally normal to about the center of the operation contact assembly viewing window 320 passes through the longitudinal axes of the operation contact assemblies 84 when in the second position. Further, the operation contact assembly interfaces 304 are within the field of view of the operation contact assembly viewing window 320. Also, the ground contact assemblies 184 are not within the field of view of the operation contact assembly viewing window 320. Thus, a user can determine if the operation contact assemblies 84 are in the second position by looking through the operation contact assembly viewing window 320.

Similarly, the ground contact assembly viewing window 322 is aligned with the column of ground contact assemblies 184 at the ground contact assembly interfaces 306. That is, a line extending generally normal to about the center of the ground contact assembly viewing window 322 passes through the longitudinal axes of the ground contact assemblies 184 when in the second position. Further, the ground contact assembly interfaces 306 are within the field of view of the ground contact assembly viewing window 322. Also, the operation contact assemblies 84 are not within the field of view of the ground contact assembly viewing window 322. Thus, a user can determine if the ground contact assemblies 184 are in the second position by looking through the ground contact assembly viewing window 322.

Further, in an exemplary embodiment, the visible break assembly 300 includes a number of offset row viewing windows 328. As used herein, an "offset row viewing window" 328 is a viewing window 302 wherein a single set of movable contact assemblies 310 is within the field of view of the offset row viewing window 328. Further, in an exemplary embodiment, each offset row viewing windows 328 is disposed at an elevation on the housing assembly 30 at about the same elevation as the operation contact assembly distal portion 83 and ground contact assembly distal portion 183 when the operation contact assembly 82, or the ground contact assembly 182, is in the first position. In this configuration, the operation contact assembly distal portion 83 and/or the ground contact assembly distal portion 183 is within the offset row viewing window 328 when the operation contact assembly 82 and/or the ground contact assembly 182 is in the first position. It is noted that, in an exemplary embodiment, there is one offset row viewing window 328 associated with each set of movable contact assemblies 310. That is, there is one offset row viewing window 328 associated with each pole of the circuit interrupter 42.

As shown in FIG. 2, at this elevation, the offset row viewing windows 328 are also disposed at about the same elevation as the openings (not shown) through which the line members 37 extend through rear sidewall 32B. Thus, if the need arose, the line members 37 could be reconfigured to extend through the front sidewall 32A via the offset row viewing windows 328. Accordingly, the offset row viewing windows 328 are removable.

As noted above, the housing assembly 30 includes a number of sidewalls 32 that define an enclosed space 31. Thus, each of the housing assembly sidewalls 32 has an inner side 33. Further, as set forth above, each sidewall 32 has an associated letter to distinguish between the various sidewalls. Hereinafter, the same letter is associated with the reference number "33" to distinguish between the various sidewall inner surfaces. Further, an enclosed space 31 tends to be dark, or, at least not brightly illuminated. In an exemplary embodiment, the visible break assembly 300 includes an exposure assembly 330 structured to increase the visibility of constructs within the field of view of the viewing windows 302. The exposure assembly 330 includes lighting elements 332 and indicia 334. In an exemplary embodiment, the lighting elements 332 are disposed within the housing assembly 30 and illuminate the sidewall inner sides 33. Further, a portion of a sidewall inner side located within the field of view of a viewing window 302 is, as used herein, a "backdrop portion" 336 The lighting elements 332 (shown schematically in FIG. 15), in an exemplary embodiment, focus their light on a backdrop portion 336. The lighting elements 332 include any type of illumination device such as, but not limited to, incandescent bulbs, LEDs, fluorescent bulbs, "glow-in-the-dark" elements, lasers, and black lights.

The indicia 334 include, but are not limited to, bright colors, high contrast colors, fluorescent colors, and reflective or shiny materials. High contrast color schemes are found both in nature, e.g. on venomous snakes and insects, as well as human made objects, e.g. road signs. High-contrast color schemes include, but are not limited to, black-yellow, black-white, red-white and white-green. A high contrast color is also evident, for example, when a reflective or shiny material has a non-reflective or non-shiny portion. Thus, an indicia 334 includes a groove cut into a shiny surface that creates a high contrast color scheme. A reflective or shiny material includes, but is not limited to, polished metals, silver elements, copper elements, and gold elements.

In an exemplary embodiment, the exposure assembly 330 includes an operation contact assembly viewing window backdrop portion 340 associated with, i.e. with the field of view of, the operation contact assembly viewing window 320. The operation contact assembly viewing window backdrop portion 340 is, in an exemplary embodiment, both illuminated by a lighting element 332 and is a high contrast color. Thus, when the operation contact assembly viewing window 320 is disposed on the front, second lateral sidewall 32C, the operation contact assembly viewing window backdrop portion 340 is disposed on the opposing lateral sidewall inner side 33D. Similarly, the exposure assembly 330 includes a ground contact assembly viewing window backdrop portion 342 associated with, i.e. with the field of view of, the ground contact assembly viewing window 322. The ground contact assembly viewing window backdrop portion 342 is, in an exemplary embodiment, both illuminated by a lighting element 332 and is a high contrast color. Thus, when the ground contact assembly viewing window 322 is disposed on the front, second lateral sidewall 32C, the ground contact assembly viewing window backdrop portion 342 is disposed on the opposing lateral sidewall inner surface 33D.

In an exemplary embodiment, the operation contact assembly viewing window backdrop portion 340 and the ground contact assembly viewing window backdrop portion 342 may be white, the operation contact assembly distal portion 83 may be red, and, the ground contact assembly distal portion 183 may be green. In this configuration, the operation contact assembly distal portion 83 and the ground contact assembly distal portion 183 have an increased visibility relative to a darkly colored construct. Further, the visibility is also increased due to the contrast with the white backdrop portions 340, 342.

In an alternative embodiment, the operation contact assembly distal portion 83 and the ground contact assembly distal portion 183 are a shiny material, such as, but not limited to, polished silver. The operation contact assembly distal portion 83 and the ground contact assembly distal portion 183 also include a number of indicia 334, such as but not limited to a scale, such as on a ruler, cut into the operation contact assembly distal portion 83 and the ground contact assembly distal portion 183.

Similarly, each offset row viewing window 328 has an associated offset row viewing window backdrop portion 350 (FIG. 16) is, in an exemplary embodiment, both illuminated by a lighting element 332 and is a high contrast color. When the operation contact assembly distal portion 83 and the ground contact assembly distal portion 183 are a high contrast color, this configuration provides for greater visibility of the operation contact assembly distal portion 83 and the ground contact assembly distal portion 183 are through the offset row viewing windows 328.

In this configuration, the visible break assembly 300 allows a user to visually determine the status of the operation contact assemblies 84 and the ground contact assemblies 184. For example, if both the operation contact assemblies 84 and the ground contact assemblies 184 are in the first position, a user can look through the operation contact assembly viewing window 320 and the ground contact assembly viewing window 322 and see the illuminated, white backdrop portions 340, 342. That is, when the operation contact assemblies 84 and the ground contact assemblies 184 are in the first position, the backdrop portions 340, 342 are unobstructed and are clearly visible. Conversely, if either of the operation contact assemblies 84 or the ground contact assemblies 184 are in the second position, the high contract between the indicia 334 on the operation contact assembly distal portion 83 (or the ground contact assembly distal portion 183) and the backdrop portions 340, 342 allows the user to determine that the operation contact assembly distal portion 83 (or the ground contact assembly distal portion 183) are in the second position.

Further, the user can also use the offset row viewing windows 328 to verify that either, or both, the operation contact assemblies 84 and the ground contact assemblies 184 are in the first position. That is, when the operation contact assemblies 84 and the ground contact assemblies 184 are in the first position, the indicia 334 on the operation contact assembly distal portion 83 and/or the ground contact assembly distal portion 183 will be visible through the offset row viewing windows 328.

In another embodiment, the visible break assembly 300 includes a substantially clear insulating material 360. In an exemplary embodiment, the clear insulating material 360 is disposed about, i.e. encircles, each movable contact assembly 54. In an exemplary embodiment, the insulating material 360 is substantially non-conductive, substantially rigid and substantially transparent and may be, but is not limited to a polycarbonate such as Lexan™ by Sabic, One Plastics Avenue, Pittsfield, Mass. 01201. In an exemplary embodiment, the insulating material 360 is shaped as a hollow tube that is disposed about the path of travel of each movable contact assembly 54. As shown, the insulating material 360 is disposed over the lower portion of the path of travel of each movable contact assembly 54, i.e. adjacent the contact assembly interface and, in another embodiment, about the contact assembly interface.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A housing assembly for a network transformer primary disconnect assembly, said network transformer primary disconnect assembly including an interlock assembly and a circuit interrupter, said circuit interrupter including a number of contact assemblies, said interlock assembly including a mechanical interlock assembly with a number of pairs of contact assemblies, each pair of contact assemblies of the mechanical interlock assembly includes a number of sets of movable contact assemblies, each set of movable contact assemblies including an operation contact assembly and a ground contact assembly, each operation contact assembly having a distal portion, each ground contact assembly having a distal portion, each said set of mechanical interlock assembly movable contact assemblies structured to move between an open, first position, wherein each said set of mechanical interlock assembly movable contact assemblies is spaced from an associated one of the circuit interrupter contact assemblies, and a closed, second position, wherein each said set of mechanical interlock assembly movable contact assemblies is coupled to, and in electrical communication with, said associated circuit interrupter contact assembly, wherein, when each said set of mechanical interlock assembly movable contact assemblies is in said second position, each said set of mechanical interlock movable contact assemblies and each circuit interrupter contact assembly meet at a contact assembly interface, said housing assembly comprising:
- a number of sidewalls defining an enclosed space;
- a visible break assembly including a number of viewing windows in at least one sidewall of said number of sidewalls;
- each said viewing window aligned with one of a contact assembly interface, a movable contact assembly operation contact assembly distal portion, or a movable contact assembly ground contact assembly distal portion when said movable contact assembly is in the open, first position; and
- a number of said viewing windows are aligned with a ground contact assembly interface.

2. The housing assembly of claim 1 wherein:
- said visible break assembly includes a clear insulating material; and
- said clear insulating material disposed about each movable contact assembly.

3. The housing assembly of claim 1 wherein within each set of contact assemblies said operation contact assembly and said ground contact assembly are disposed in an offset row, and wherein:
- at least one operation contact assembly includes an associated operation contact assembly viewing window; and
- at least one ground contact assembly includes an associated ground contact assembly viewing window.

4. The housing assembly of claim 3 wherein said number of contact assemblies includes a plurality of operation contact assemblies and a plurality of ground contact assemblies, wherein said operation contact assemblies are disposed in an aligned column, and, wherein said ground contact assemblies are disposed in an aligned column, and wherein:
- said operation contact assembly aligned column includes an associated operation contact column viewing window; and
- said ground contact assembly aligned column includes an associated ground contact column viewing window.

5. The housing assembly of claim 4 wherein each set of movable contact assemblies includes an associated offset row viewing window.

6. The housing assembly of claim 5 wherein:
- said number of sidewalls includes a generally vertical first sidewall and a generally vertical second sidewall;
- said first and second sidewalls disposed generally perpendicular to each other;
- each said offset row viewing window disposed on said first sidewall; and
- said operation contact assembly viewing window disposed on said second sidewall; and
- said ground contact assembly viewing window disposed on said second sidewall.

7. The housing assembly of claim 6 wherein each said offset row viewing window is removable.

8. The housing assembly of claim 1 further including an exposure assembly structured to increase the visibility of movable contact assemblies within the field of view of the viewing windows.

9. The housing assembly of claim 1 wherein:
- said enclosed space includes an inner surface;
- said inner surface includes a number of backdrop portions;
- each backdrop portion associated with one said viewing window; and
- each said backdrop portion being one of a bright color or a high contrast color.

10. The housing assembly of claim 1 wherein said sidewalls define a submersible enclosed space.

* * * * *